(12) United States Patent
Abe

(10) Patent No.: US 9,443,172 B2
(45) Date of Patent: Sep. 13, 2016

(54) IMAGE FORMING APPARATUS

(71) Applicant: BROTHER KOGYO KABUSHIKI KAISHA, Nagoya-shi, Aichi-ken (JP)

(72) Inventor: Naoki Abe, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/831,471

(22) Filed: Aug. 20, 2015

(65) Prior Publication Data
US 2016/0063363 A1 Mar. 3, 2016

(30) Foreign Application Priority Data

Aug. 29, 2014 (JP) ................................ 2014-176044

(51) Int. Cl.
*G03G 15/00* (2006.01)
*G06K 15/12* (2006.01)
*G03G 15/043* (2006.01)

(52) U.S. Cl.
CPC ......... *G06K 15/1219* (2013.01); *G03G 15/043* (2013.01)

(58) Field of Classification Search
CPC ................... G03G 15/221; G03G 15/04072; G03G 15/326; G03G 15/04018; B41J 2/45
USPC ........................................................ 399/4
See application file for complete search history.

(56) References Cited

U.S. PATENT DOCUMENTS 5,461,414 A * 10/1995 Honda ................... B41J 2/471
347/250
9,207,560 B2 12/2015 Abe 9,250,557 B2 2/2016 Shiomichi
9,268,250 B2 2/2016 Ishikawa
(Continued)

FOREIGN PATENT DOCUMENTS

| JP | 9-323446 A | 12/1997 |
| JP | 10-157196 A | 6/1998 |
| JP | 3187131 B2 | 7/2001 |
| JP | 2007-320160 A | 12/2007 |
| JP | 2012-011632 A | 1/2012 |

OTHER PUBLICATIONS

Machine translation of Kubo JP 2012-011632 A, publication date: Jan. 19, 2012.*

(Continued)

*Primary Examiner* — Walter L Lindsay, Jr.
*Assistant Examiner* — Frederick Wenderoth
(74) *Attorney, Agent, or Firm* — Merchant & Gould P.C.

(57) ABSTRACT

An image forming apparatus includes a light source, a reflector, a photosensitive member, a light receiver, and an integrated circuit chip. The integrated circuit chip outputs, to the light source, a lighting signal for controlling lighting of the light source. The integrated circuit chip includes a synchronizing signal output circuit, a receiver, a first OR circuit, and a first wiring line. The synchronizing signal output circuit is configured to output a synchronizing signal for lighting the light source. The receiver is configured to receive a first image data signal outputted from an external circuit, the first image data signal being for lighting the light source. The first OR circuit is configured to output a first lighting signal that is a logical sum of the synchronizing signal and the first image data signal. The first wiring line connects the synchronizing signal output circuit with the first OR circuit.

14 Claims, 8 Drawing Sheets

(56) References Cited

U.S. PATENT DOCUMENTS

| | | |
|---|---|---|
| 2004/0184827 A1 | 9/2004 | Yamada |
| 2011/0229172 A1 | 9/2011 | Miyadera et al. |
| 2014/0063286 A1* | 3/2014 | Okada .................. H04N 5/2353 348/229.1 |
| 2014/0118456 A1 | 5/2014 | Kondo |
| 2016/0063362 A1 | 3/2016 | Abe |

OTHER PUBLICATIONS

Application as filed in related U.S. Appl. No. 14/831,462 on Aug. 20, 2015.

Office Action issued in related U.S. Appl. No. 14/831,462 on Feb. 5, 2016.

U.S. Office Action (Notice of Allowance), issued in related U.S. Appl. No. 14/831,462, Jun. 1, 2016.

\* cited by examiner

IMAGE FORMING APPARATUS

CROSS REFERENCE TO RELATED APPLICATIONS

This application claims priority from Japanese Patent Application No. 2014-176044 filed Aug. 29, 2014. The entire content of the priority application is incorporated herein by reference.

TECHNICAL FIELD

The disclosure relates to an image forming apparatus.

BACKGROUND

Conventionally, an image forming apparatus is known in which a light beam emitted by a light source is reflected by a reflector and is emitted to a photosensitive member. This image forming apparatus has a forced signal output circuit, a light receiver, and an image data output circuit. The forced signal output circuit outputs a forced lighting signal. The light beam emitted from the light source based on the forced lighting signal and reflected by the reflector is received by a light receiver. The image data output circuit outputs an image data signal at timing corresponding to reception of the light beam by the light receiver. The light beam emitted from the light source based on the image data signal and reflected by the reflector forms a scanning line on the photosensitive member.

In such image forming apparatus, a forced lighting signal outputted from the forced signal output circuit and an image data signal outputted from the image data output section are inputted to an OR circuit, and a lighting signal that is a logical sum of the forced lighting signal and the image data signal is outputted to the light source.

SUMMARY

According to one aspect, this specification discloses an image forming apparatus. The image forming apparatus includes a light source, a reflector, a photosensitive member, a light receiver, and an integrated circuit chip. The reflector is configured to reflect a light beam emitted from the light source. The photosensitive member is configured to be irradiated by the light beam reflected by the reflector. The light receiver is configured to receive the light beam reflected by the reflector. The integrated circuit chip is configured to output, to the light source, a lighting signal for controlling lighting of the light source. The integrated circuit chip includes a synchronizing signal output circuit, a receiver, a first OR circuit, and a first wiring line. The synchronizing signal output circuit is configured to output a synchronizing signal for lighting the light source. The receiver is configured to receive a first image data signal outputted from an external circuit, the first image data signal being a signal for lighting the light source. The first OR circuit is configured to output a first lighting signal that is a logical sum of the synchronizing signal and the first image data signal. The first wiring line connects the synchronizing signal output circuit with the first OR circuit.

The technology disclosed in this specification can be realized in various modes. For example, the technology can be realized in modes of an image forming apparatus, an exposure device, a light source controller that outputs a lighting signal to a light source, an integrated circuit chip for realizing functions of such apparatus and device, and so on.

BRIEF DESCRIPTION OF THE DRAWINGS

Embodiments in accordance with the disclosure will be described in detail with reference to the following figures wherein.

DETAILED DESCRIPTION

In the above-described conventional image forming apparatus, the waveform of the lighting signal may change due to various reasons. For example, in the conventional image forming apparatus, each of the forced signal output circuit and the OR circuit is provided at separate integrated circuit chips arranged in different units. Hence, the forced lighting signal outputted from the forced signal output circuit attenuates before being inputted to the OR circuit, and so on, and thus the waveform of the forced lighting signal sometimes changes, which changes the waveform of the lighting signal. If the waveform of lighting signal changes, a problem arises that the timing at which a light beam is received by the light receiver and the lighting period of the light source based on the lighting signal become inaccurate.

Some aspects of the disclosure will be described while referring to the accompanying drawings.

Figure 1:
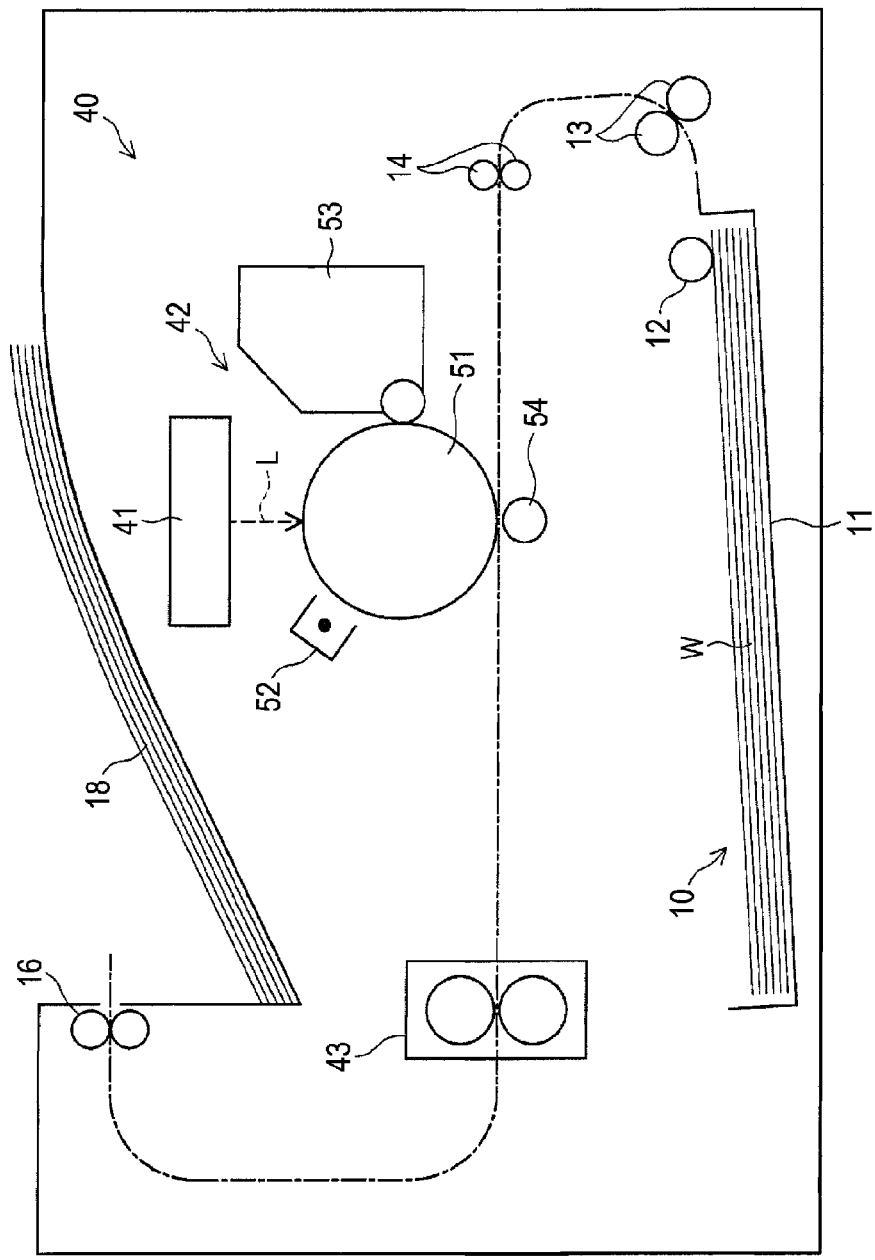
FIG. 1 is a schematic view showing the configuration of a printer.

The configuration of a printer 100 according to an embodiment will be described with reference to FIGS. 1 to 4. The printer 100 of the present embodiment is an electrophotographic image forming apparatus. As shown in FIG. 1, the printer 100 includes a paper feeding unit 10 and an image forming unit 40.

The paper feeding unit 10 includes a tray 11, a pickup roller 12, a conveying roller 13 and a registration roller 14. Sheets W stored in the tray 11 are taken out with the pickup roller 12 one sheet at a time, the sheet W is conveyed by the conveying roller 13, its position is corrected with the registration roller 14 and the sheet W is fed to the image forming unit 40 with particular timing.

The image forming unit 40 includes an exposure unit 41, a process unit 42 and a fixing unit 43. The exposure unit 41 applies a laser light L to a photosensitive member 51, which will be described later. The configuration of the exposure unit 41 will be described later.

The process unit 42 includes the photosensitive member 51, a charger 52, a developing unit 53 and a transfer roller 54. The charger 52 uniformly charges the surface of the photosensitive member 51. When the laser light L is irradiated from the exposure unit 41 described above onto the surface of the photosensitive member 51 uniformly charged by the charger 52, an electrostatic latent image is formed on the surface of the photosensitive member 51. The developing unit 53 supplies toner to develop the electrostatic latent image formed on the surface of the photosensitive member 51. In this way, a toner image is formed on the surface of the photosensitive member 51. The transfer roller 54 is arranged opposite the photosensitive member 51, and transfers the toner image formed on the surface of the photosensitive member 51 to the sheet W which is conveyed.

The fixing unit 43 is arranged on the downstream side in the conveying direction of the sheet W with respect to the photosensitive member 51, and fixes the toner image to the sheet W by heat. Thereafter, the sheet W is discharged through a discharge roller 16 to a discharge tray 18 formed on the upper surface of the printer 100.

Figure 2:
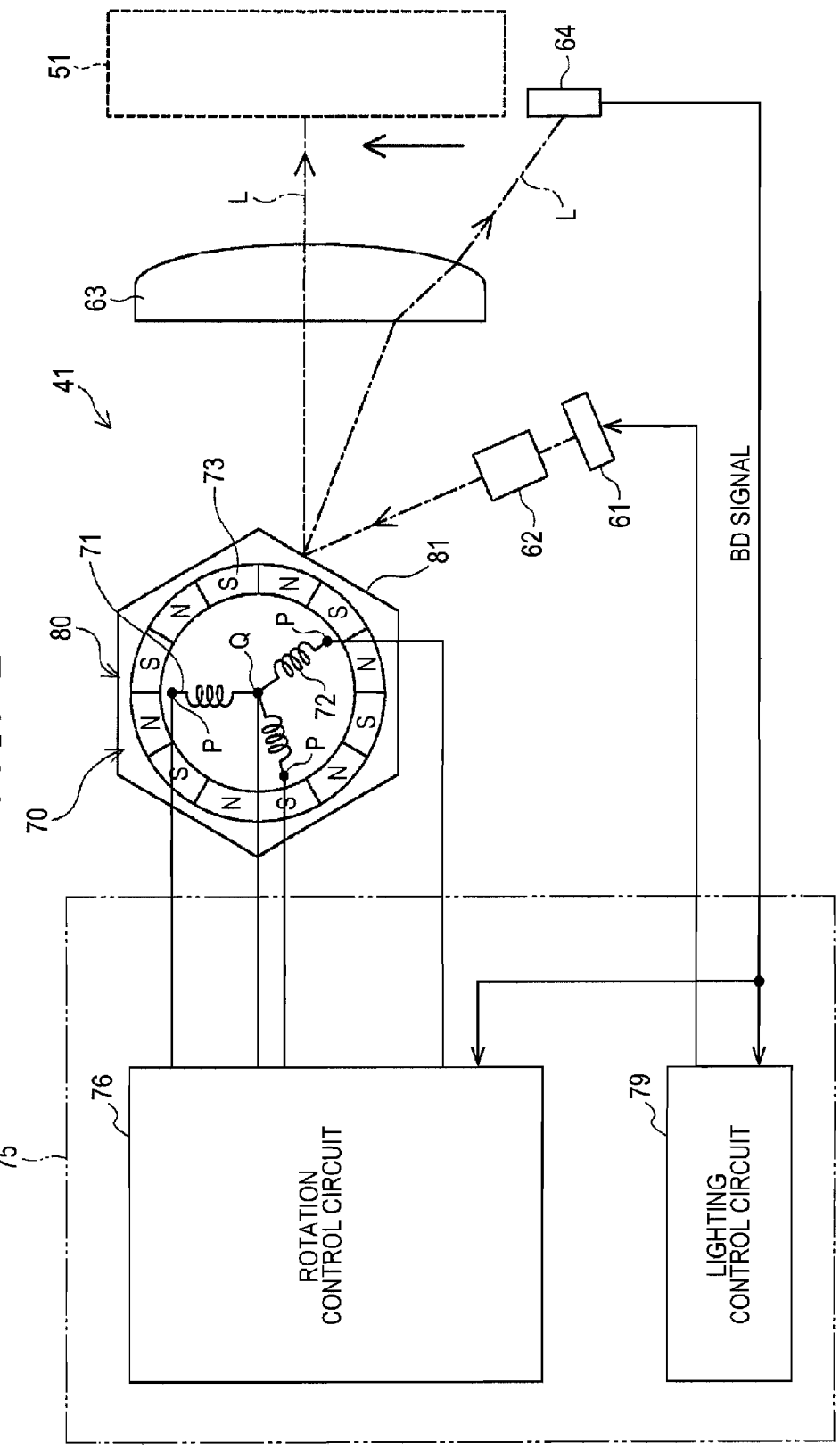
FIG. 2 is a schematic view showing the configuration of an exposure unit.

As shown in FIG. 2, the exposure unit 41 includes a laser diode (hereinafter referred to as an "LD") 61 that emits the laser light L, a first lens portion 62, a polygon mirror 80, a polygon motor 70, a second lens portion 63, a beam detector (hereinafter referred to as a "BD") 64 and a control board 75. The LD 61 is an example of a light source, and the laser light L is an example of a light beam. The polygon mirror 80 is an example of a reflector, and the BD 64 is an example of a light receiver.

The polygon motor 70 is a three-phase brushless DC motor, and includes a stator 71 and a rotor 73 where a 12-pole permanent magnet is arranged. The stator 71 includes coils 72 corresponding to the three phases (U phase, V phase, and W phase, for example). The coils 72 are electrically connected to each other by star wiring connection.

The polygon mirror 80 includes 6 mirror surfaces 81 that are arranged to form the side surface of a regular hexagonal prism. The polygon mirror 80 is driven to rotate by the polygon motor 70. Specifically, the polygon mirror 80 is fixed to the rotor 73 of the polygon motor 70, and is rotated as the rotor 73 is rotated.

The first lens portion 62 is formed with, for example, a cylindrical lens, and applies the laser light L emitted from the LD 61 toward the polygon mirror 80. The second lens portion 63 is formed with, for example, an fθ lens, and applies the laser light L applied from the first lens portion 62 and reflected off the mirror surfaces 81 of the polygon mirror 80 toward the surface of the photosensitive member 51.

The photosensitive member 51 is disposed at a position to which laser light L reflected by the polygon mirror 80 is irradiated. When the polygon mirror 80 rotates due to rotation of the rotor 73, the angle of the mirror surface 81 relative to the irradiate direction of laser light L from the first lens portion 62 changes cyclically, and hence the laser light L is deflected cyclically by the mirror surface 81. By this operation, a scanning line by the laser light L is formed on the surface of the photosensitive member 51.

The BD 64 is disposed at a position at which the BD 64 receives the laser light L reflected by the polygon mirror 80. Specifically, the BD 64 is disposed at a position through which the laser light L reflected by the polygon mirror 80 passes before scanning the photosensitive member 51, the position being a position at which the BD 64 receives the laser light L reflected by the mirror surface 81 in a state where the angle of the mirror surface 81 relative to the irradiate direction of the laser light L is a particular angle.

Figure 5:
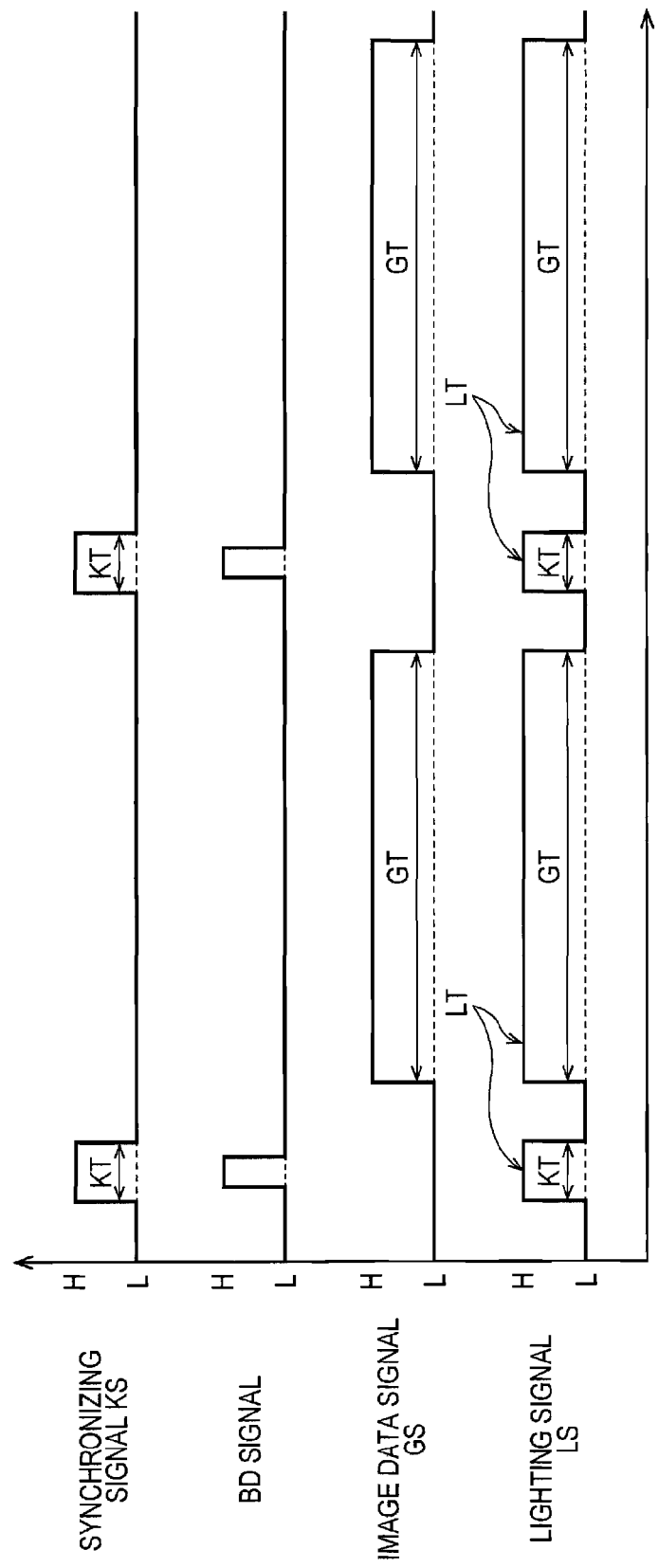
FIG. 5 is a timing chart showing the waveforms of a synchronizing signal, a BD signal, an image data signal, and a lighting signal.

The BD 64 outputs a BD signal that becomes L level at timing when laser light L is not received and that becomes H level at timing when laser light L is received. The BD signal is shown in FIG. 5. For example, the BD signal is used for determining writing start timing of a scanning line by laser light L.

The control board 75 includes a rotation control circuit 76 and a lighting control circuit 79. The rotation control circuit 76 is a circuit that controls rotation of the polygon motor 70 in accordance with instructions from a CPU 31 described later. The BD signal is inputted to the rotation control circuit 76. By referring to the BD signal, the rotation cycle and the rotation speed of the polygon mirror 80 are determined. Hence, the rotation control circuit 76 controls rotation of the polygon motor 70 by using the BD signal. The lighting control circuit 79 will be described in greater detail.

Figure 3:
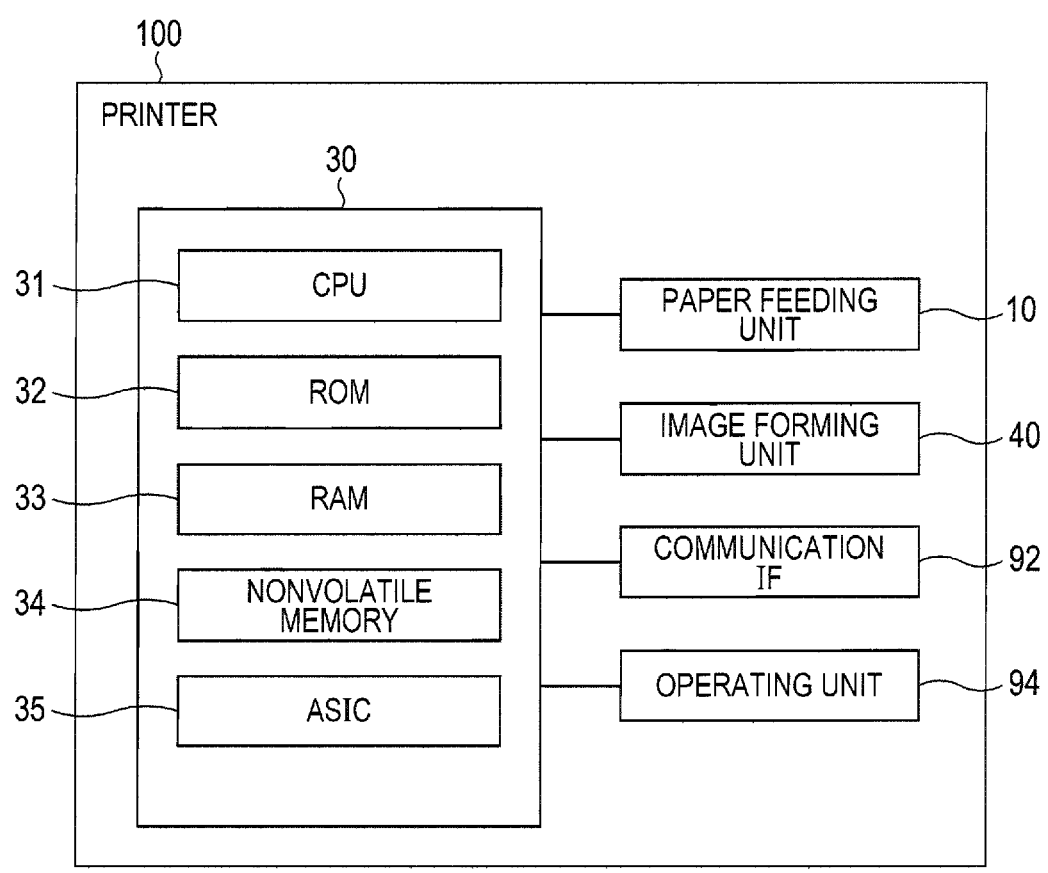
FIG. 3 is a block diagram showing the configuration of the printer.

As shown in FIG. 3, the printer 100 includes, in addition to the paper feeding unit 10 and the image forming unit 40 described above, a communication interface 92, an operating unit 94 that receives an operation by a user, and a controller 30 that controls the printer 100.

The operating unit 94 includes various types of buttons and a touch panel (both of which are not shown) that receive the operation by the user. The touch panel also functions as a display unit that displays various types of information. The communication interface 92 is hardware that allows communication with an external device 200 shown in FIG. 4, for example. Specifically, the communication interface 92 is, for example, a network interface, a serial communication interface, or a parallel communication interface. The printer 100 receives image data of a print target through the communication interface 92 from the external device 200.

The controller 30 includes the CPU 31, a ROM 32, a RAM 33, a nonvolatile memory 34, and an ASIC (Application Specific Integrated Circuit) 35. In the ROM 32, a control program for controlling the printer 100, various types of settings, initial values and so on are stored. The RAM 33 is used as an operation area when the CPU 31 performs various types of programs or an area that temporarily stores data. The nonvolatile memory 34 is a rewritable memory such as an NVRAM, a flash memory, a HDD, an EEPROM, and so on. The ASIC 35 is a hardware circuit dedicated for, for example, image processing. The CPU 31 controls each element of the printer 100 according to the control program read from the ROM 32 and signals fed from various types of sensors. The CPU 31 is electrically connected to a controller 122 (described later) of the lighting control circuit 79 for transmitting control signals to the controller 122.

Figure 4:
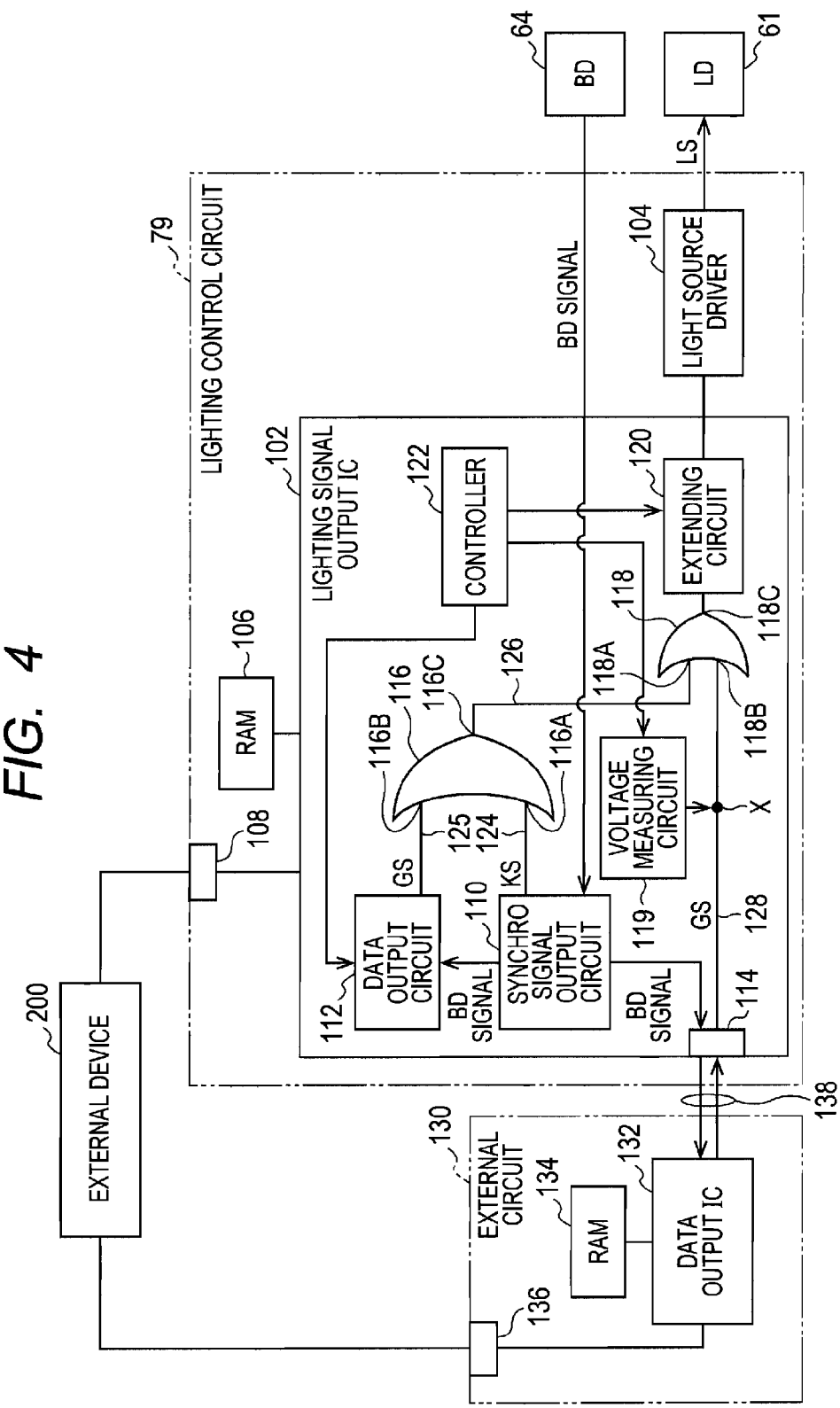
FIG. 4 is a block diagram showing the configuration of a lighting control circuit.

Next, the lighting control circuit 79 of the control board 75 will be described. The lighting control circuit 79 is a circuit that performs lighting control of the LD 61 in accordance with instructions from the CPU 31. As shown in FIG. 4, the lighting control circuit 79 includes a lighting signal output IC 102 that outputs a lighting signal LS to the LD 61, a light source driver 104 that controls lighting of the light source by the lighting signal LS, a RAM 106, and a communication interface 108 connecting to the external device 200. The lighting signal LS is shown in FIG. 5. The lighting signal output IC 102 is an example of an integrated circuit chip.

The lighting signal output IC 102 includes a synchronizing (synchro) signal output circuit 110, a data output circuit 112, a receiver 114 electrically connected to an external circuit 130 through a wiring line 138, an OR circuit 116, an OR circuit 118, a voltage measuring circuit 119, an extending circuit 120, and a controller 122.

The synchronizing signal output circuit 110 outputs a synchronizing signal KS for lighting the LD 61 at timing when it is assumed that the BD 64 receives laser light L reflected by the polygon mirror 80. As shown in FIG. 5, the synchronizing signal KS becomes H level at the timing when the LD 61 is lighted and becomes L level at the timing other than that. When a BD signal is inputted from the BD 64 based on output of the synchronizing signal KS, the synchronizing signal output circuit 110 transfers the BD signal to the data output circuit 112 and a data output IC 132 described later.

The RAM 106 temporarily stores image data acquired from the external device 200 through the communication interface 108. The data output circuit 112 outputs an image data signal GS for lighting the LD 61 at timing when a scanning line is formed on the photosensitive member 51, in response to reception of laser light L by the BD 64. Specifically, upon receiving the BD signal from the synchronizing signal output circuit 110, the data output circuit 112 outputs the image data signal GS based on image data stored in the RAM 106 after a margin period in the main scanning direction elapses from the timing at which the BD signal changes to H level. This image data signal GS is an example of a second image data signal.

The external circuit 130 includes the data output IC 132, a RAM 134, and a communication interface 136 for connecting to the external device 200. The RAM 134 temporarily stores image data acquired from the external device 200 through the communication interface 136. Upon receiving the BD signal from the synchronizing signal output circuit 110, the data output IC 132 transmits, to the receiver 114, the image data signal GS based on image data stored in the RAM 134 after a margin period in the main scanning direction elapses from the timing at which the BD signal changes to H level.

By this operation, the receiver 114 receives the image data signal GS outputted from the external circuit 130, in response to reception of laser light L by the BD 64. The image data signal GS is a signal for lighting the LD 61 at the timing when a scanning line is formed on the photosensitive member 51. Hence, writing start timing of the scanning line by the laser light L can be determined based on the BD signal. As shown in FIG. 5, the image data signal GS becomes H level at the timing when the LD 61 is lighted and becomes L level at the timing other than that. This image data signal GS is an example of a first image data signal.

One input terminal 116A of the OR circuit 116 is connected to the synchronizing signal output circuit 110 through a wiring line 124, and the synchronizing signal KS is inputted to the input terminal 116A. Another input terminal 116B of the OR circuit 116 is connected to the data output circuit 112 through a wiring line 125. As will be described later, when the controller 122 stops output of the image data signal GS from the data output circuit 112, the synchronizing signal KS is outputted from an output terminal 116C of the OR circuit 116. The wiring line 124 is an example of a first wiring line, and the wiring line 125 is an example of a second wiring line.

One input terminal 118A of the OR circuit 118 is connected to the output terminal 116C of the OR circuit 116 through a wiring line 126. When output of the image data signal GS from the data output circuit 112 is stopped by the controller 122, the synchronizing signal KS is inputted to the input terminal 118A. Another input terminal 118B of the OR circuit 118 is connected to the receiver 114 through a wiring line 128. The voltage measuring circuit 119 measures a voltage of a measurement point X provided on the wiring line 128.

As will be described later, when the image data signal GS from the external circuit 130 is received by the receiver 114, the image data signal GS is inputted to the input terminal 118B of the OR circuit 118. With this operation, the lighting signal LS, which is the logical sum of the synchronizing signal KS and the image data signal GS is outputted from an output terminal 118C of the OR circuit 118. This lighting signal LS is an example of a first lighting signal.

The lighting signal LS is a signal that becomes H level at the timing when the LD 61 is lighted and that becomes L level at the timing other than that. As shown in FIG. 5, a period in which the lighting signal LS is H level (hereinafter referred to as "lighting period LT") includes a period in which the synchronizing signal KS is H level (hereinafter referred to as "forced lighting period KT") and a period in which the image data signal GS is H level (hereinafter referred to as "exposure lighting period GT"). The exposure lighting period GT is an example of a lighting period based on an image data signal.

The forced lighting period KT and the exposure lighting period GT have different lengths from each other due to signals that are set. The forced lighting period KT is set based on the synchronizing signal KS, and is set to a sufficient length for the BD 64 to receive laser light L. On the other hand, the exposure lighting period GT is set based on the image data signal GS. The image data signal GS repeats changing between H level and L level depending on image data. Hence, as shown in FIG. 6, the exposure lighting period GT includes a unit lighting period UT of which a period of H level is shorter than the forced lighting period KT.

As shown in FIG. 4, the synchronizing signal KS is inputted to the OR circuit 118 through the wiring lines 124, 126 in the lighting signal output IC 102. On the other hand, the image data signal GS is inputted to the OR circuit 118 through the wiring line 138 outside the lighting signal output IC 102. Hence, the image data signal GS tends to be more easily affected by noises and crosstalk from outside the lighting signal output IC 102 than the synchronizing signal KS, and its waveform tends to be deformed by attenuation.

Figure 6:
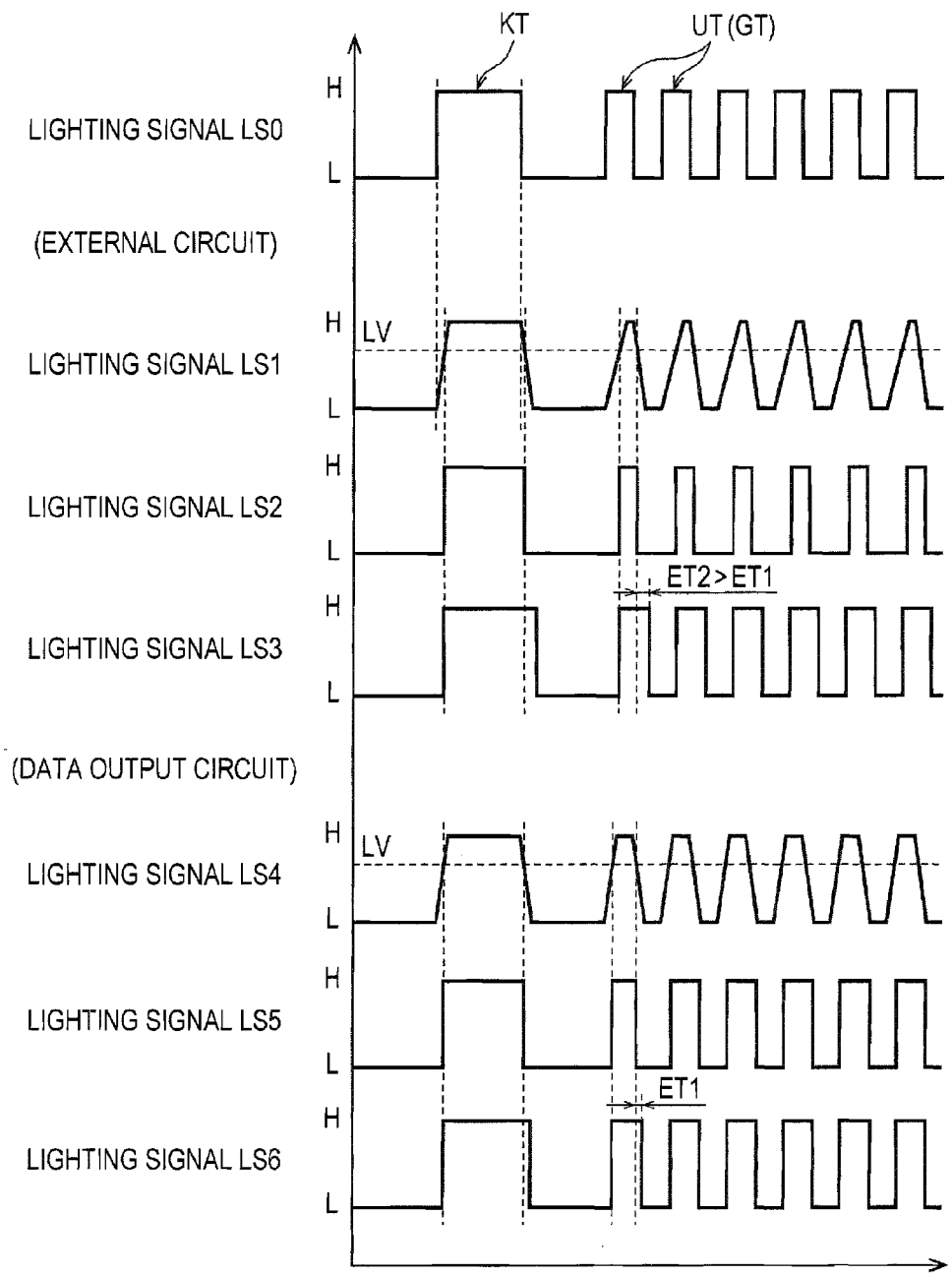
FIG. 6 is a timing chart showing the waveforms of the lighting signal.

FIG. 6 shows waveforms of the lighting signal LS. A lighting signal LS0 is a lighting signal in an ideal state in which the synchronizing signal KS and the image data signal GS have no attenuation. A lighting signal LS1 is a lighting signal that is outputted from the OR circuit 118 by using the image data signal GS received from the external circuit 130. A lighting signal LS2 is a lighting signal that is obtained by binarizing the lighting signal LS1 by using a certain threshold value LV. A binarization process of the lighting signal is performed by the extending circuit 120 and the light source driver 104.

As shown in FIG. 6, in the lighting signal LS1, for example, the waveform of a rising portion of the exposure lighting period GT is gentler (less steep) than the waveform of a rising portion of the forced lighting period KT. Hence, when the lighting signal LS2 is compared with the lighting signal LS0, the shortened amount of the exposure lighting period GT is larger than the shortened amount of the forced lighting period KT. Thus, when the length of the unit lighting period UT included in the exposure lighting period GT is shortened, there is a case that the LD 61 is not lighted sufficiently by using the unit lighting period UT.

Figure 7:
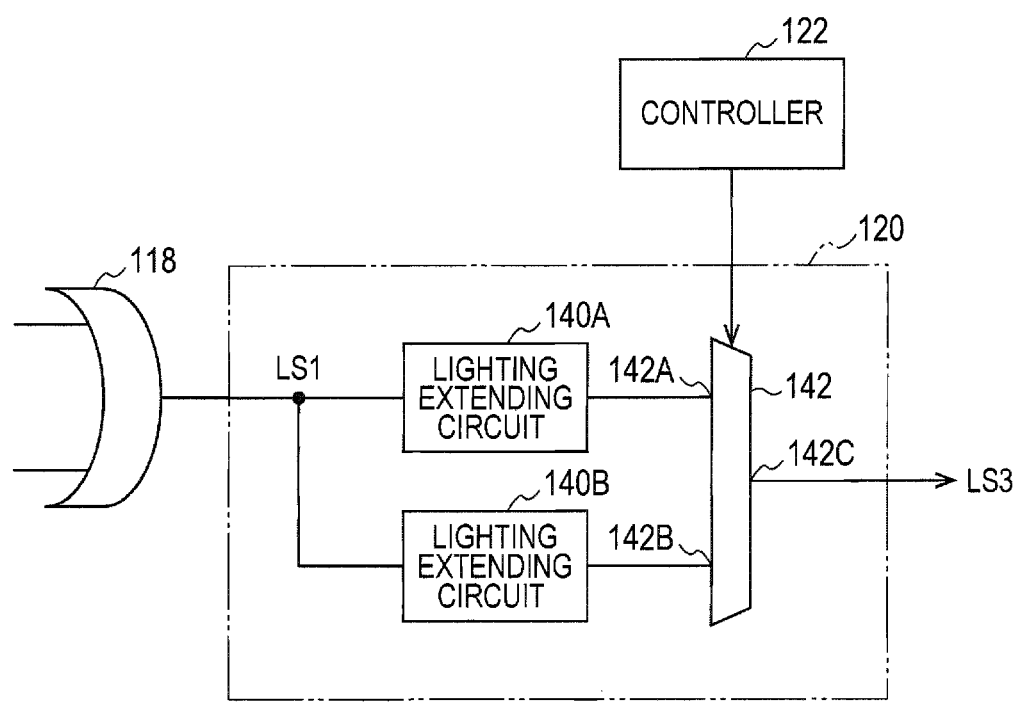
FIG. 7 is a block diagram showing the configuration of an extending circuit.

The lighting signal output IC 102 of the present embodiment has the extending circuit 120 that extends the lighting period LT based on the lighting signal LS. The extending circuit 120 is provided at a downstream side of the OR circuit 118 (between the OR circuit 118 and the light source driver 104) in the present embodiment. Specifically, as shown in FIG. 7, the extending circuit 120 includes two lighting extending circuits 140A, 140B and a switcher 142. The lighting extending circuit 140B extends the lighting period LT by an extension period ET2 that is longer than an extension period ET1 of the lighting extending circuit 140A. The extension periods ET1, ET2 are shown in FIG. 6. That is, the extending circuit 120 extends the lighting period LT by the two extension periods ET1, ET2 having different lengths from each other. The lighting extending circuit 140B extends the lighting period LT by a longer period than the lighting extending circuit 140A does. The lighting extending circuit 140A is an example of a first extending circuit, and the lighting extending circuit 140B is an example of a second extending circuit.

The lighting extending circuit 140B generates the lighting signal LS2 from the lighting signal LS1. The lighting extending circuit 140B extends the lighting period LT by delaying falling timing of the forced lighting period KT and the exposure lighting period GT of the lighting signal LS2, that is, end timing of each lighting period, by the corresponding extension period ET2. The lighting extending circuit 140B outputs a lighting signal LS3, which is obtained by extending the lighting period LT of the lighting signal LS2, to the corresponding input terminal 142B of the switcher 142. The lighting signal LS3 is shown in FIG. 6.

The lighting extending circuit 140A generates the lighting signal LS5 from the lighting signal LS4. The lighting extending circuit 140A extends the lighting period LT by delaying falling timing of the forced lighting period KT and the exposure lighting period GT of the lighting signal LS5, that is, end timing of each lighting period, by the corresponding extension period ET1. The lighting extending circuit 140A outputs a lighting signal LS6, which is obtained by extending the lighting period LT of the lighting signal LS5, to the corresponding input terminal 142A of the switcher 142. The lighting signal LS6 is shown in FIG. 6.

The switcher 142 switches which circuit of the lighting extending circuit 140A and the lighting extending circuit 140B to be used to extend the lighting period LT based on the lighting signal LS2 or LS5. The switcher 142 is a selector circuit in which the two lighting extending circuits 140A, 140B are connected to the two input terminals 142A, 142B, respectively. In accordance with instructions from the controller 122, the switcher 142 connects one of the two input terminals 142A, 142B to an output terminal 142C, for switching the input terminal 142A, 142B connected to the output terminal 142C. With this configuration, the lighting signal LS3 or LS6 extended by the lighting extending circuit 140A, 140B associated with the input terminal 142A, 142B connected to the output terminal 142C is outputted to the light source driver 104.

The light source driver 104 drives the LD 61 to emit light in the lighting period LT of the lighting signal LS3 or LS6 outputted from the extending circuit 120. In the lighting signal LS3 or LS6, because the unit lighting period UT included in the exposure lighting period GT is also extended, the LD 61 is lighted sufficiently by using the unit lighting period UT.

The controller 122 controls each circuit of the lighting signal output IC 102, in accordance with instructions from the CPU 31. Further, the controller 122 executes an output determining process of determining whether to prohibit a signal output from the data output circuit 112, in accordance with instructions from the CPU 31.

Figure 8:
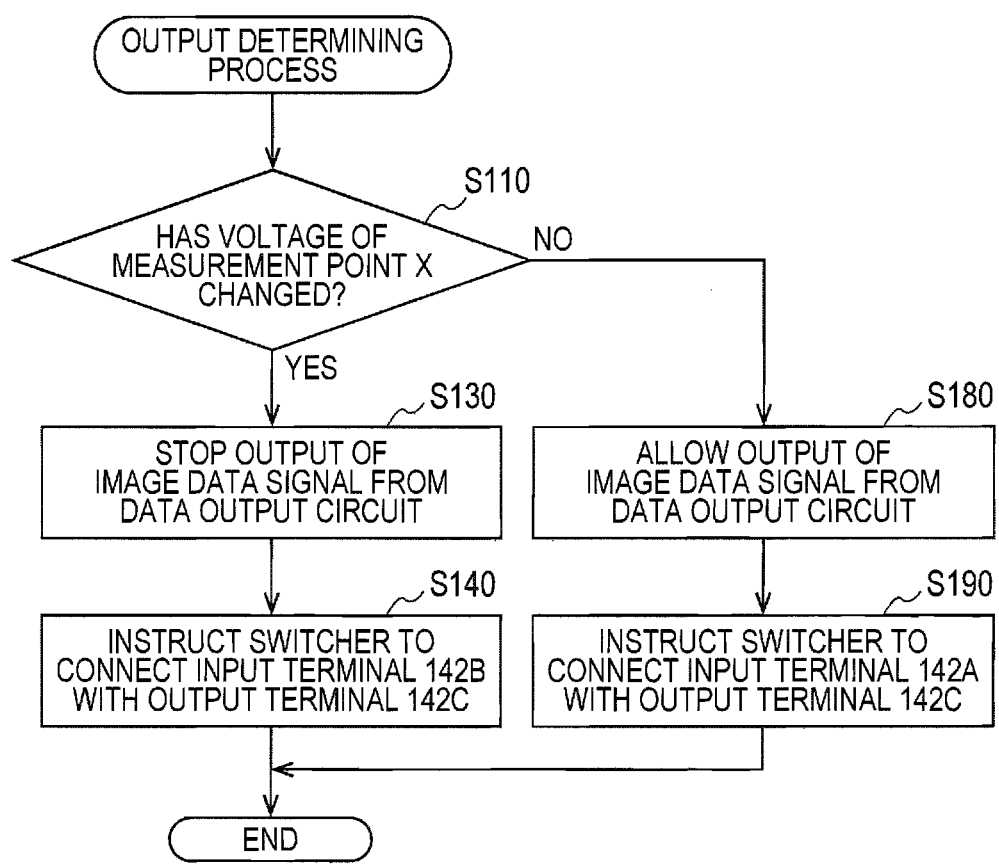
FIG. 8 is a flowchart showing the flow of an output determining process.

The specific flow of the output determining process will be described while referring to FIG. 8. The output determining process is started when a power of the printer 100 is turned on. First, the controller 122 measures the voltage of the measurement point X by using the voltage measuring circuit 119, and determines whether the voltage of the measurement point X has changed (S110). If the voltage of the measurement point X has changed within a particular period (S110: YES), the controller 122 determines that the image data signal GS is received from the external circuit 130.

If it is determined that the image data signal GS is received from the external circuit 130, the controller 122 controls lighting of the LD 61 based on the image data signal GS received from the external circuit 130. Specifically, the controller 122 turns off a switch (not shown) provided inside the data output circuit 112 for switching whether to output the image data signal GS, to stop output of the image data signal GS from the data output circuit 112 (S130). Further, the controller 122 instructs the switcher 142 to connect the input terminal 142B with the output terminal 142C (S140). With this operation, the input terminal 142B is connected to the output terminal 142C, and the lighting period LT based on the lighting signal LS that is the logical sum of the image data signal GS received from the external circuit 130 and the synchronizing signal KS is extended by the lighting extending circuit 140B of which the extension period ET is longer than the lighting extending circuit 140A.

On the other hand, if the voltage of the measurement point X has not changed within the particular period (S110: NO), the controller 122 determines that the image data signal GS is not received from the external circuit 130.

If it is determined that the image data signal GS is not received from the external circuit 130, the controller 122 controls lighting of the LD 61 based on the image data signal GS outputted from the data output circuit 112. Specifically, the controller 122 turns on the switch provided inside the data output circuit 112, to allow output of the image data signal GS from the data output circuit 112 (S180). Further, the controller 122 instructs the switcher 142 to connect the input terminal 142A with the output terminal 142C (S190). With this operation, the input terminal 142A is connected to the output terminal 142C, and the lighting period LT based on the lighting signal LS that is the logical sum of the image data signal GS outputted from the data output circuit 112 and the synchronizing signal KS is extended by the lighting extending circuit 140A of which the extension period ET is shorter than the lighting extending circuit 140B.

As described above, when output of the image data signal GS from the data output circuit 112 is allowed by the controller 122, the image data signal GS is inputted to the input terminal 116B of the OR circuit 116 through the wiring line 125. Further, the synchronizing signal KS is inputted to the input terminal 116A of the OR circuit 116 through the wiring line 124. Thus, the lighting signal LS, which is the logical sum of the synchronizing signal KS and the image data signal GS is outputted from the output terminal 116C of the OR circuit 116. This lighting signal LS is an example of a second lighting signal.

The lighting signal LS outputted from the output terminal 116C of the OR circuit 116 is inputted to the extending circuit 120 through the OR circuit 118, and is outputted to the LD 61 through the light source driver 104. That is, the lighting signal output IC 102 is configured to output the lighting signal LS even when the image data signal GS is not received from the external circuit 130.

Hence, the lighting signal output IC 102 is configured to check whether the LD 61, the polygon mirror 80, and so on are operating normally, when the image data signal GS is not received from the external circuit 130, such as when the external circuit 130 is not electrically connected to the receiver 114. The RAM 106 stores a test pattern that is an example of image data. The lighting signal output IC 102 outputs the lighting signal LS based on the test pattern when the image data signal GS is not received from the external circuit 130. Thus, regardless of whether the external circuit 130 is operating normally, it can be checked whether the LD 61, the polygon mirror 80, and so on are operating normally.

Further, the lighting signal LS outputted from the output terminal 116C of the OR circuit 116 is generated by the synchronizing signal KS and the image data signal GS inputted to the OR circuit 116 through the wiring lines 124, 125 within the lighting signal output IC 102, and inputted to the OR circuit 118 through the wiring line 126 within the lighting signal output IC 102. Hence, the lighting signal LS outputted from the output terminal 116C of the OR circuit 116 is less likely to be affected by noises and crosstalk from outside the lighting signal output IC 102, and its waveform is less likely to be deformed by attenuation.

A lighting signal LS4 in FIG. 6 shows a waveform of a lighting signal outputted from the OR circuit 118 by using the image data signal GS outputted from the data output circuit 112. In addition, a lighting signal LS5 shows a waveform of a lighting signal that is obtained by binarizing the lighting signal LS4 by using a certain threshold value LV. As shown in FIG. 6, in the lighting signal LS4, the waveform of a rising portion of the exposure lighting period GT is kept steep, compared with the lighting signal LS1, for example. Hence, the shortened amount of the exposure lighting period GT of the lighting signal LS5 is smaller than the shortened amount of the exposure lighting period GT of the lighting signal LS2.

In order to compensate a difference of the shortened amounts of the exposure lighting period GT between the lighting signal LS2 and the lighting signal LS5, the lighting period LT of the lighting signal LS5 is extended by the lighting extending circuit 140A of which the extension period EL is relatively short, and is extended to a lighting signal LS6. As a result of this, the exposure lighting period GT of the lighting signal LS6 becomes substantially equal to the exposure lighting period GT of the lighting signal LS3.

As described above, in the printer 100 of the present embodiment, the synchronizing signal output circuit 110 and the OR circuits 116, 118 are provided within the same lighting signal output IC 102, and the synchronizing signal KS is inputted to the OR circuits 116, 118 through the wiring line 124 provided within the lighting signal output IC 102. Hence, compared with a case in which the synchronizing signal output circuit 110 and the OR circuits 116, 118 are provided at separate integrated circuit chips, and the synchronizing signal KS is inputted to the OR circuits 116, 118 through wiring lines provided outside the integrated circuit chip, changes of the waveform of the synchronizing signal KS are suppressed, and changes of the waveform of the lighting signal LS are suppressed.

On the other hand, in the printer 100, the image data signal GS is inputted to the OR circuit 118 through the wiring line 138 outside the lighting signal output IC 102. Hence, when the image data signal GS is transmitted through the wiring line 138, there is a case in which the waveform of the image data signal GS changes due to noises and crosstalk from outside the lighting signal output IC 102, and the exposure lighting period GT is shortened. In the printer 100 of the present embodiment, the extending circuit 120 is provided within the lighting signal output IC 102, and shortening of the exposure lighting period GT can be compensated by the extending circuit 120.

In the printer 100 of the present embodiment, the extending circuit 120 has the two lighting extending circuits 140A, 140B that extend the lighting period LT by the two extension periods ET1, ET2 having different lengths from each other, so that the circuit for extending the lighting period LT can be switched between these circuits 140A, 140B. Hence, the lighting period LT can be extended depending on a degree of changes of the waveform of the image data signal GS.

In the printer 100 of the present embodiment, the data output circuit 112 is provided within the lighting signal output IC 102. Hence, even when the receiver 114 does not receive the image data signal GS from the external circuit 130, the lighting signal LS can be outputted to the LD 61 by using the image data signal GS outputted from the data output circuit 112.

Further, since the data output circuit 112 is provided within the lighting signal output IC 102, the synchronizing signal output circuit 110, the data output circuit 112, and the OR circuits 116, 118 are provided within the same lighting signal output IC 102. In this case, the synchronizing signal KS and the image data signal GS outputted from the data output circuit 112 are inputted to the OR circuit 116 through the wiring lines 124, 125 provided within the lighting signal output IC 102. Hence, compared with a case in which these circuits 110, 112, 116, 118 are provided separately at a plurality of integrated circuit chips, and at least one of the synchronizing signal KS and the image data signal GS outputted from the data output circuit 112 is inputted to the OR circuits 116, 118 through a wiring line provided outside the integrated circuit chip, changes of the waveforms of the synchronizing signal KS and the image data signal GS outputted from the data output circuit 112 are suppressed, and changes of the waveform of the lighting signal LS can be suppressed.

In the printer 100 of the present embodiment, the switcher 142 of the extending circuit 120 performs switching such that the lighting period LT of the lighting signal LS generated by using the image data signal GS outputted from the data output circuit 112 is extended by the lighting extending circuit 140A of a relatively short extension period. Further, the switcher 142 of the extending circuit 120 performs switching such that the lighting period LT of the lighting signal LS generated by using the image data signal GS received from the external circuit 130 is extended by the lighting extending circuit 140B of a relatively long extension period. Hence, the lighting period LT can be extended depending on the circuit from which the image data signal GS is outputted.

In the printer 100 of the present embodiment, the RAM 106 of the lighting control circuit 79 stores a test pattern, and the data output circuit 112 outputs the image data signal GS based on the test pattern. Hence, in a state where the receiver 114 does not receive the image data signal GS from the external circuit 130, the operations of the LD 61, the polygon motor 70, and so on can be checked by using the test pattern.

While the disclosure has been described in detail with reference to the above aspects thereof, it would be apparent to those skilled in the art that various changes and modifications may be made therein without departing from the scope of the claims.

The configuration of the printer 100 in the above-described embodiment is simply an example, and various variations are possible. For example, the processes performed by one CPU 31 in the above-described embodiment may be performed a plurality of CPUs, may be performed only by a dedicated hardware circuit such as the ASIC 35, or may be performed by a combination of a CPU and a hardware circuit.

Although in the above-described embodiment the printer 100 is described as an example of the image forming apparatus, the image forming apparatus includes a multi-function peripheral and so on. Further, in the above-described embodiment, the printer 100 of monochromatic-type that forms images by using toner of one color is described as an example of the image forming apparatus. Another example of the image forming apparatus includes a color printer that forms images by using toner of a plurality of colors. The present disclosure can be applied to such a color printer.

In the above-described embodiment, the number of poles of the rotor 73 is 12, and number of mirror surfaces 81 of the polygon mirror 80 is six. However, the number of poles of the rotor 73 and the number of mirror surfaces 81 of the polygon mirror 80 are not limited to these numbers.

Further, the configuration and function of the extending circuit 120 in the above-described embodiment are merely an example, and various modifications can be made. For example, in the above-described embodiment, the extending circuit 120 extends the lighting period LT of the lighting signal LS. However, because the synchronizing signal output circuit 110 and the OR circuits 116, 118 are provided within the same lighting signal output IC 102 and the changes of the waveform of the synchronizing signal KS are suppressed, the exposure lighting period GT of the image data signal GS may be extended. In this case, the extending circuit 120 may be provided on the wiring line 128 (between the receiver 114 and the OR circuit 118). Further, the circuit may be so configured that the switcher performs switching such that a lighting period based on the image data signal GS from the external circuit 130 is extended by the lighting extending circuit 140B, and a lighting period based on the image data signal GS from the data output circuit 112 is extended by the lighting extending circuit 140A.

Further, in the above-described embodiment, the extending circuit 120 has two lighting extending circuits 140A, 140B. However, the extending circuit 120 may have three or more lighting extending circuits.

Further, in the above-described embodiment, the data output circuit 112 is provided at the lighting signal output IC 102. However, it is not always necessary that the data output circuit 112 be provided at the lighting signal output IC 102.

If the data output circuit 112 is not provided, the RAM 106 for storing the test pattern and a communication interface need not be provided at the lighting signal output IC 102. Also, the extending circuit 120 need not have two lighting extending circuits 140A, 140B, and need not have the switcher 142, either.

Further, the controller 122 may be provided within the data output circuit 112. In this case, instead of turning off the switch for switching whether to output the image data signal GS to stop output of the image data signal GS from the data output circuit 112, the controller 122 may mask the image data signal GS outputted by the data output circuit 112. Further, instead of turning on the switch provided within the data output circuit 112 to allow output of the image data signal GS from the data output circuit 112, the controller 122 may unmask (put off mask) the image data signal GS outputted by the data output circuit 112.

What is claimed is:

1. An image forming apparatus comprising:
    a light source;
    a reflector configured to reflect a light beam emitted from the light source;
    a photosensitive member configured to be irradiated by the light beam reflected by the reflector;
    a light receiver configured to receive the light beam reflected by the reflector;
    an external circuit configured to output a first image data signal, the external circuit being configured to be electrically connected to an external device that provides print data; and
    an integrated circuit chip configured to output, to the light source, a lighting signal for controlling lighting of the light source, the integrated circuit chip comprising:
        a synchronizing signal output circuit configured to output a synchronizing signal for lighting the light source before the light receiver receives the light beam reflected by the reflector;
        an electric-signal receiver configured to be electrically connected to the external circuit, the electric-signal receiver being configured to receive the first image data signal outputted from the external circuit, the first image data signal being a signal for lighting the light source;
        a first OR circuit configured to output a first lighting signal that is a logical sum of the synchronizing signal and the first image data signal; and
        a first wiring line connecting the synchronizing signal output circuit with the first OR circuit.

2. The image forming apparatus according to claim 1, wherein the integrated circuit chip further comprises an extending circuit provided at a downstream side of the first OR circuit so as to extend a lighting period based on the lighting signal.

3. The image forming apparatus according to claim 1, wherein the integrated circuit chip further comprises an extending circuit provided between the receiver and the first OR circuit so as to extend a lighting period based on the first image data signal.

4. An image forming apparatus comprising:
    a light source;
    a reflector configured to reflect a light beam emitted from the light source;
    a photosensitive member configured to be irradiated by the light beam reflected by the reflector;
    a light receiver configured to receive the light beam reflected by the reflector; and
    an integrated circuit chip configured to output, to the light source, a lighting signal for controlling lighting of the light source, the integrated circuit chip comprising:
        a synchronizing signal output circuit configured to output a synchronizing signal for lighting the light source;
        a receiver configured to receive a first image data signal outputted from an external circuit, the first image data signal being a signal for lighting the light source;
        a first OR circuit configured to output a first lighting signal that is a logical sum of the synchronizing signal and the first image data signal, and
        a first wiring line connecting the synchronizing signal output circuit with the first OR circuit; and
        an extending circuit provided at a downstream side of the first OR circuit so as to extend a lighting period based on the lighting signal the extending circuit comprising:
            a first extending circuit configured to extend the lighting period by a first extension period;

a second extending circuit configured to extend the lighting period by a second extension period longer than the first extension period; and a switcher configured to switch a circuit to be used for extending the lighting period, between the first extending circuit and the second extending circuit.

5. The image forming apparatus according to claim 4, wherein the integrated circuit chip further comprises:

a data output circuit configured to output a second image data signal for lighting the light source in response to reception of the light beam by the light receiver;

a second OR circuit having input terminals connected to the synchronizing signal output circuit and the data output circuit, and having an output terminal connected to the first OR circuit; and a second wiring line connecting the data output circuit with the second OR circuit; and wherein the second OR circuit is configured to output a second lighting signal that is a logical sum of the synchronizing signal and the second image data signal.

6. The image forming apparatus according to claim 5, wherein the switcher is configured to perform switching such that:

a lighting period based on the first lighting signal is extended by the second extending circuit; and a lighting period based on the second lighting signal is extended by the first extending circuit.

7. The image forming apparatus according to claim 5, wherein the switcher is configured to perform switching such that:

a lighting period based on the first image data signal is extended by the second extending circuit; and a lighting period based on the second image data signal is extended by the first extending circuit.

8. The image forming apparatus according to claim 6, further comprising a memory configured to store a test pattern, wherein the data output circuit is configured to output the second image data signal based on the test pattern.

9. The image forming apparatus according to claim 5, wherein the integrated circuit chip further comprises:

a controller configured to perform:

determining whether the first image data signal is received from the external circuit through the receiver;

in response to determining that the first image data signal is received, stopping output of the second image data signal from the data output circuit; and in response to determining that the first image data signal is not received, allowing output of the second image data signal from the data output circuit.

10. The image forming apparatus according to claim 9, further comprising:

a third wiring line connecting the receiver with the first OR circuit; and a voltage measuring circuit configured to measure a voltage of a measurement point provided on the third wiring line, wherein the controller is configured to determine whether the first image data signal is received from the external circuit, based on measurement by the voltage measuring circuit.

11. An image forming apparatus comprising:

a light source;

a reflector configured to reflect a light beam emitted from the light source;

a photosensitive member configured to be irradiated by the light beam reflected by the reflector;

a light receiver configured to receive the light beam reflected by the reflector;

an external circuit configured to output a first image data signal, the external circuit being configured to be electrically connected to an external device that provides print data; and an integrated circuit chip configured to output, to the light source, a lighting signal for controlling lighting of the light source, the integrated circuit chip comprising:

a synchronizing signal output circuit configured to output a synchronizing signal for lighting the light source before the light receiver receives the light beam reflected by the reflector;

an electric-signal receiver configured to be electrically connected to the external circuit, the electric-signal receiver being configured to receive the first image data signal outputted from the external circuit, the first image data signal being a signal for lighting the light source;

a data output circuit configured to output a second image data signal for lighting the light source; and an OR circuit configured to output the lighting signal that is a logical sum of the synchronizing signal, the first image data signal, and the second image data signal.

12. The image forming apparatus according to claim 11, wherein the integrated circuit chip further comprises an extending circuit provided at a downstream side of the OR circuit so as to extend a lighting period based on the lighting signal.

13. The image forming apparatus according to claim 12, wherein the extending circuit comprises:

a first extending circuit configured to extend the lighting period by a first extension period;

a second extending circuit configured to extend the lighting period by a second extension period longer than the first extension period; and a switcher configured to switch a circuit to be used for extending the lighting period, between the first extending circuit and the second extending circuit.

14. The image forming apparatus according to claim 11, further comprising a memory configured to store a test pattern, wherein the data output circuit is configured to output the second image data signal based on the test pattern.

* * * * *